US010200887B2

(12) United States Patent
Thanayankizil et al.

(10) Patent No.: US 10,200,887 B2
(45) Date of Patent: Feb. 5, 2019

(54) OPTIMIZING USER EXPERIENCE IN VEHICLES WITH MULTIPLE HOTSPOTS

(71) Applicant: GM Global Technology Operations LLC, Detroit, MI (US)

(72) Inventors: Lakshmi V. Thanayankizil, Rochester Hills, MI (US); Nikhil N. Neti, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 143 days.

(21) Appl. No.: 15/277,180

(22) Filed: Sep. 27, 2016

(65) Prior Publication Data
US 2018/0091985 A1 Mar. 29, 2018

(51) Int. Cl.
*H04W 24/02* (2009.01)
*H04W 48/08* (2009.01)
*H04W 4/02* (2018.01)
*H04W 4/04* (2009.01)
*H04W 40/24* (2009.01)

(52) U.S. Cl.
CPC ........... *H04W 24/02* (2013.01); *H04W 4/023* (2013.01); *H04W 4/046* (2013.01); *H04W 48/08* (2013.01); *H04W 40/246* (2013.01)

(58) Field of Classification Search
None
See application file for complete search history.

(56) References Cited

U.S. PATENT DOCUMENTS

| 7,079,015 | B2 * | 7/2006 | Gibeau | B60R 16/0315 340/425.5 |
| 2003/0157975 | A1 * | 8/2003 | Kadel | H04W 84/005 455/41.2 |
| 2011/0246637 | A1 * | 10/2011 | Murakami | H04W 84/20 709/223 |
| 2012/0039248 | A1 * | 2/2012 | Schneider | H04W 84/005 370/328 |
| 2013/0281021 | A1 * | 10/2013 | Palin | H04W 8/005 455/41.2 |
| 2016/0007274 | A1 * | 1/2016 | Park | H04W 48/16 455/434 |
| 2017/0054694 | A1 * | 2/2017 | Fujikami | H04L 9/08 |
| 2017/0070976 | A1 * | 3/2017 | Shirakawa | H04W 48/20 |

* cited by examiner

*Primary Examiner* — Robert C Scheibel
(74) *Attorney, Agent, or Firm* — David Willoughby; Reising Ethington P.C.

(57) ABSTRACT

A vehicle, and methods of operating a mobile hotspot at a vehicle including a plurality of mobile hotspots, are disclosed. The method includes detecting an availability of a first one of the mobile hotspot as an access point. The method also includes delaying an availability of a second one of the mobile hotspots as an access point by a period of time after the detection of the availability of the first one of the mobile hotspots. The vehicle may include a plurality of mobile hotspots, each configured to provide wireless connectivity for one or more non-vehicle wireless devices located in the vehicle or within a proximity of the vehicle. In accordance with the method, one of the mobile hotspots may be configured to delay its availability as an access point by a period of time after an availability of at least another one of the mobile hotspots is detected.

13 Claims, 3 Drawing Sheets

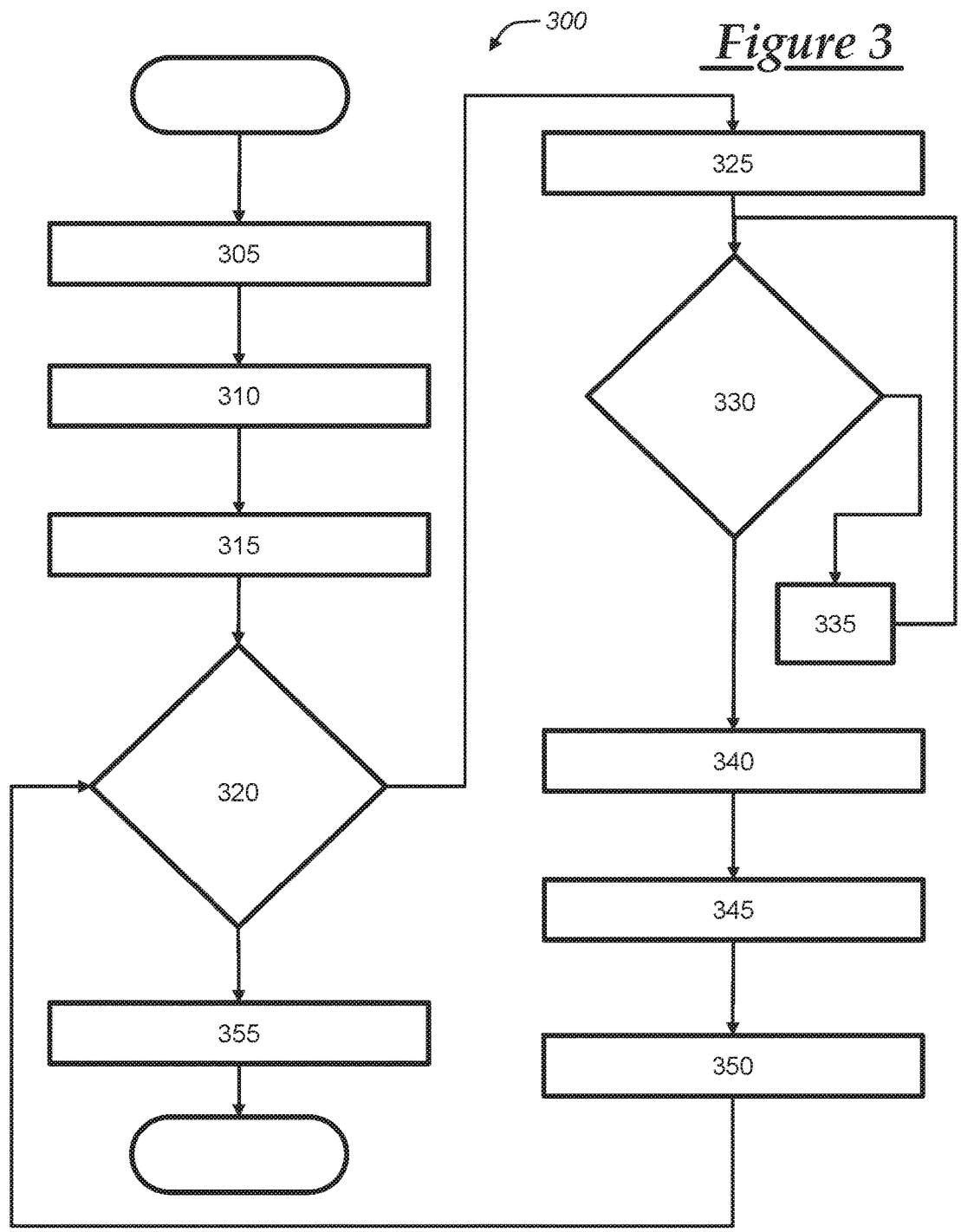

OPTIMIZING USER EXPERIENCE IN VEHICLES WITH MULTIPLE HOTSPOTS

TECHNICAL FIELD

The present invention relates generally to hotspots in a vehicle and, more particularly, to managing interactions of multiple hotspots at a vehicle with one or more non-vehicle devices.

BACKGROUND

One emerging area of technology in the automotive industry is the incorporation of computer systems into vehicles. Some computer systems may control the operation of vehicle components (e.g., the body control module), while others may allow the vehicle to communicate with remote locations (e.g., using a telematics module via cellular communication) or locally with other devices via short-range wireless communications. Some vehicles now come equipped with mobile hotspot capabilities such that nearby devices can connect to the Internet or other network via a router that is incorporated into the vehicle. Some vehicles, in fact, may be equipped with multiple hotspots configured to offer different capabilities depending on the device(s) seeking to access the Internet or other network.

Given the different capabilities of the various types of mobile hotspots that may be provided in a vehicle and the different compatibilities of mobile devices, users may be inconvenienced if their mobiles device does not connect to a hotspot that is best suited for their particular device or needs.

SUMMARY

According to an embodiment of the invention, a method of operating a mobile hotspot at a vehicle including a plurality of mobile hotspots includes detecting an availability of a first one of the mobile hotspot as an access point. The method also includes delaying an availability of a second one of the mobile hotspots as an access point for a period of time after the detection of the availability of the first one of the mobile hotspots. In some exemplary illustrations, the first one of the mobile hotspots is made available as an access point in response to a vehicle start event.

According to an embodiment of the invention, a vehicle may include a plurality of mobile hotspots. Each of the hotspots may be configured to provide wireless connectivity for one or more non-vehicle wireless devices located in the vehicle or within a proximity of the vehicle. One of the mobile hotspots may be configured to delay its availability as an access point for a period of time after an availability of at least another one of the mobile hotspots is detected.

BRIEF DESCRIPTION OF THE DRAWINGS

One or more embodiments of the invention will hereinafter be described in conjunction with the appended drawings, wherein like designations denote like elements, and wherein:

FIG. 3 is a flowchart illustrating a method of operating multiple vehicle hotspots at a vehicle.

DETAILED DESCRIPTION OF THE ILLUSTRATED EMBODIMENT(S)

The system and method described below generally facilitate efficient operation and startup of a plurality of vehicle hotspots in order to minimize any inconvenience to the vehicle user(s). More specifically, where the hotspots offer different levels of functionality, capabilities, or compatibilities with a pool of devices that may be used to communicate via the hotspots, availability of one or more hotspots may be delayed in order to allow the devices to collectively connect to the most appropriate hotspot.

System—

Figure 1:
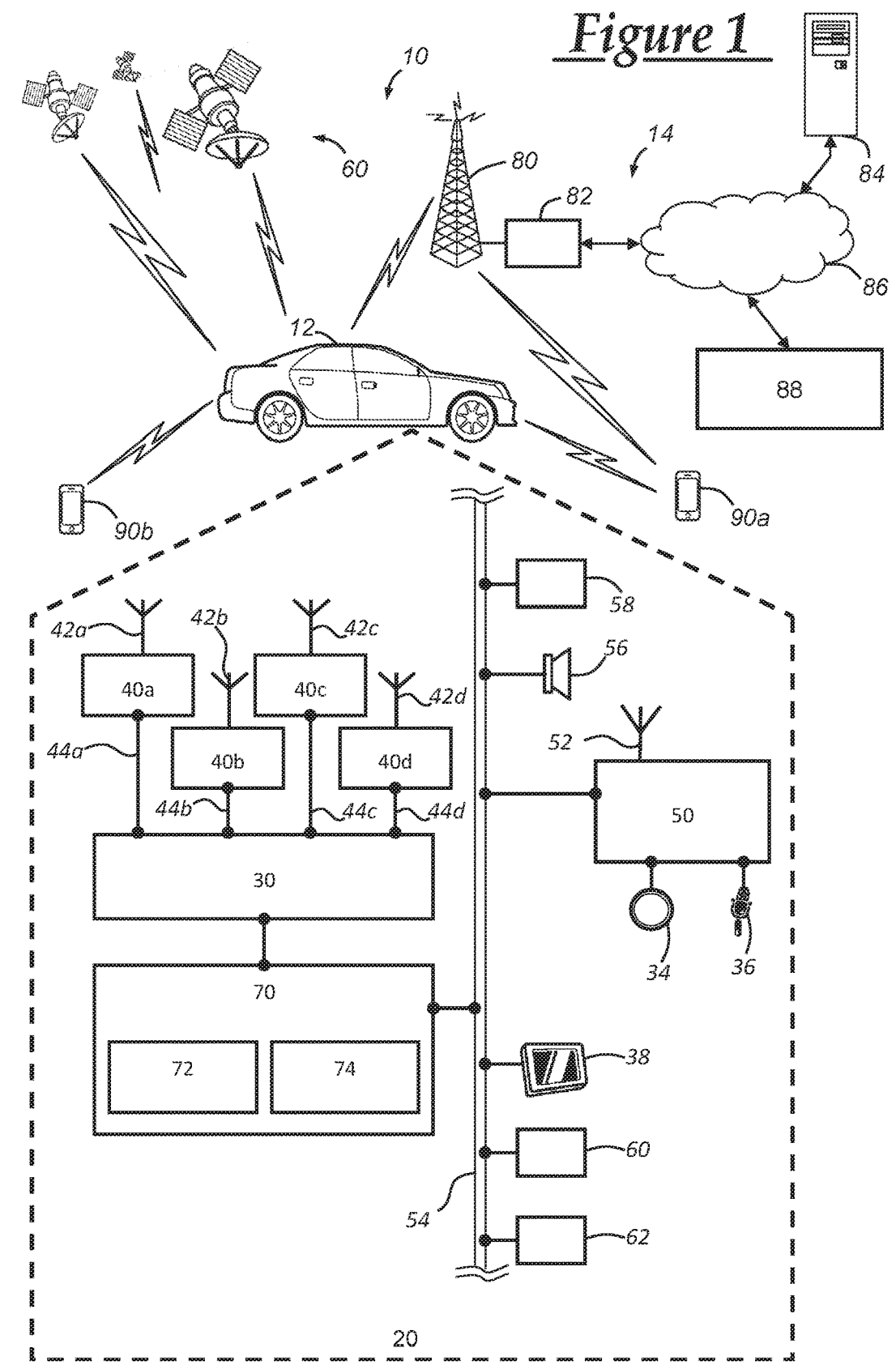
FIG. 1 is a block diagram depicting an embodiment of a communications system that is capable of utilizing the method disclosed herein.

Referring first to FIG. 1, there is provided a system 10 that provides for the operation of multiple hotspots. The system 10 may be used to carry out the methods described herein. System 10 generally contains a vehicle 12 and a cellular network 14. Vehicle 12 may connect via a wired or wireless connection to devices 90a and 90b through use of vehicle electronics 20 which is included in the vehicle, and may provide Internet to these devices via cellular network 14. Vehicle electronics 20 includes a router 30, wireless access points or hotspots 40a-d, a telematics unit 50, a controller 70, and other modules, devices, and components, as well as communication busses, such as communication bus 54. Cellular network 14 includes a plurality of cell towers 80 (only one shown), one or more mobile switching centers (MSCs) 82 (only one shown), a land network 86, a remote facility 88, and a computer 84. It should be appreciated that the disclosed methods can be used with any number of different systems and are not specifically limited to the operating environment shown here. Thus, the following paragraphs simply provide a brief overview of one such system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a router 30, wireless access points 40a-d (WAPs) (i.e. hotspots), a telematics unit 50, a GPS module 60, a controller 70, and numerous other components and devices. Some or all of the different vehicle electronics may be connected for communication with each other via one or more communication busses, such as bus 54. Communications bus 54 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Wireless router 30 operates by providing multiple vehicle hotspots or wireless access points 40a-d for vehicle 12 and can be an OEM-installed (embedded) or aftermarket device that is installed in the vehicle and that may direct traffic between one or more devices, namely for directing traffic between one or more wireless devices 90 and the Internet. Router 30 may be operatively connected to telematics unit 50 (or even integrated therein), thereby enabling router 30 to communicate with remote devices and/or establish an Internet connection via sending and receiving data transmissions over one or more wireless protocols described below with respect to telematics unit 50. Wireless access points 40a-d may be integrated within router 30 or may be separate devices that are either OEM-installed and/or aftermarket devices. Each wireless access point includes an antenna 42a-d thereby enabling the router 30 to transmit and receive wireless signals to and from devices 90a and 90b via the wireless access points. The wireless access points 40a-d and the router 30 may operate according to a wireless protocol. For example, the wireless protocol may be a WiFi protocol that uses IEEE 802.11b or IEEE 802.11g standards. Router 30 may be connected to bus 54 thereby allowing router 30 to provide Internet (or other network) connectivity to any device also connected to bus 54. Controller 70 is connected to router 30 and controls operation of the router according to the illustrated method of FIG. 4. As will be described further below, each of the wireless access points 40a-d may have different capabilities and/or compatibilities with respect to facilitating communications of the mobile devices 90a and 90b.

Controller 70 may be part of router 30 or may be a separate stand-alone module. Controller 70 may be directly wired to router 30, wired to bus 54, and/or may be a wireless controller. Controller 70 includes a processor 74, memory 72, software, and interface circuitry to interact with router 30 and devices over bus 54. The processor and memory enable the controller to implement software or firmware installed thereon. Controller 70 carries out various vehicle functions, namely functions used to operate router 30. For example, controller 70 may direct router 30 to configure the channel of operations for each of the respective WAPs 40a-d. For another example, router 30 may be powered on, powered off, reset, or set to a low-power standby mode or other mode by controller 70. In addition, if controller 70 is connected to bus 54, controller 70 may control operations of other various electronic components that are also connected to bus 54. In this regard, controller 70 may be integrated in with another portion of vehicle electronics 20 and need not be a dedicated module used only for controlling router 30.

Telematics unit 50 can be an OEM-installed (embedded) or aftermarket device that is installed in the vehicle and that enables wireless voice and/or data communication over cellular network 14 and via wireless networking. This enables the vehicle to communicate with remote facility 88, devices 90, other telematics-enabled vehicles, or some other entity or device. The telematics unit preferably uses radio transmissions to establish a communications channel (a voice channel and/or a data channel) with cellular network 14 so that voice and/or data transmissions can be sent and received over the channel. By providing both voice and data communication, telematics unit 50 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 88) and data communication (e.g., to provide GPS location data or vehicle diagnostic data to the remote facility 88), the system can utilize a single call over a voice channel and switch as needed between voice and data transmission over the voice channel, and this can be done using techniques known to those skilled in the art.

According to one embodiment, telematics unit 50 utilizes cellular communication according to either GSM, CDMA, LTE, VoLTE, or any other suitable standard and thus includes a cellular chipset (not shown) for voice communications like hands-free calling, a wireless modem for data transmission, an electronic processing device (not shown), one or more digital memory devices (not shown), and an antenna 52. It should be appreciated that the modem can either be implemented through software that is stored in the telematics unit and is executed by the processor, or it can be a separate hardware component located internal or external to telematics unit 50. The modem can operate using any number of different standards or protocols such as LTE, EVDO, CDMA, GPRS, and EDGE. Wireless networking between the vehicle and other networked devices can also be carried out using telematics unit 50. For this purpose, telematics unit 50 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can be set up to automatically receive an assigned IP address from another device on the network such as a router or from a network address server.

Telematics unit 50 can be used to provide a diverse range of vehicle services that involve wireless communication to and/or from the vehicle. This includes providing Internet access to the router 30 and access points 40a-d via the cellular network 14. For this purpose, the telematics unit 50 can be a separate vehicle system module communicating with controller 70 over the bus 54, as shown, or can be connected more directly to the controller 70, router 30, and/or access points 40a-d or integrated with any of them. Some of the other telematics services include: turn-by-turn directions and other navigation-related services that are provided in conjunction with the GPS-based vehicle navigation module 60; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 50, but are simply an enumeration of some of the services that the telematics unit is capable of offering. Furthermore, it should be understood that at least some of the aforementioned modules could be implemented in the form of software instructions saved internal or external to telematics unit 50, they could be hardware components located internal or external to telematics unit 50, or they could be integrated and/or shared with each other or with other systems located throughout the vehicle, to cite but a few possibilities. In the event that the modules are implemented as VSMs 62 located external to telematics unit 50, they could utilize bus 54 to exchange data and commands with the telematics unit.

GPS module 60 receives radio signals from a constellation of GPS satellites (not shown). From these signals, the module 60 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 60), or some or all navigation services can be done via telematics unit 50, wherein the position information is sent to a remote location for purposes of providing the vehicle with navigation maps, map annotations (points of interest, restaurants, etc.), route calculations, and the like. The position information can be supplied to remote facility 88 or other remote computer system, such as computer 84, for other purposes, such as fleet management. Also, new or updated map data can be downloaded to the GPS module 60 from the remote facility 88 via the telematics unit 50.

Apart from the GPS module 60, the vehicle 12 can include other vehicle system modules (VSMs) 62 in the form of electronic hardware components that are located throughout the vehicle and typically receive input from one or more sensors and use the sensed input to perform diagnostic, monitoring, control, reporting and/or other functions. Each of the VSMs 62 is preferably connected by communications bus 54 to the other VSMs, as well as to the telematics unit 50, and can be programmed to run vehicle system and subsystem diagnostic tests. As examples, one VSM 62 can be an engine control module (ECM) that controls various aspects of engine operation such as fuel ignition and ignition timing, another VSM 62 can be a powertrain control module that regulates operation of one or more components of the vehicle powertrain, and another VSM 62 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including pushbuttons(s) 34, microphone 36, visual display 38, audio system 56, and pedestrian friendly alert function (PFAF) 58. As used herein, the term 'vehicle user interface' broadly includes any suitable form of electronic device, including both hardware and software components, which is located on the vehicle and enables a vehicle user to communicate with or through a component of the vehicle. Microphone 36 provides audio input to the telematics unit to enable the driver or other occupant to provide voice commands and carry out hands-free calling via the cellular network 14. For this purpose, it can be connected to an on-board automated voice processing unit utilizing human-machine interface (HMI) technology known in the art. The pushbutton(s) 34 allow manual user input into the telematics unit 50 to initiate wireless telephone calls and provide other data, response, or control input. Separate pushbuttons can be used for initiating emergency calls versus regular service assistance calls to the remote facility 88. Audio system 56 provides audio output to a vehicle occupant and can be a dedicated, stand-alone system or part of a primary vehicle audio system. According to the particular embodiment shown here, audio system 56 is operatively coupled to communications bus 54 and can provide sound from sources such as AM, FM and satellite radio, CD, DVD and other multimedia sources. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless cellular network 14 may be a cellular carrier system that includes a plurality of cell towers 80 (only one shown), one or more mobile switching centers (MSCs) 82 (only one shown), as well as any other networking components required to connect cell towers 80 with land network 86. Each cell tower 80 includes sending and receiving antennas and a base station, with the base stations from different cell towers being connected to the MSC 82 either directly or via intermediary equipment such as a base station controller. Cellular network 14 can implement any suitable communications technology, including for example, analog technologies such as AMPS, or the newer digital technologies such as LTE, EVDO, CDMA, GPRS, and EDGE. As will be appreciated by those skilled in the art, various cell tower/base station/MSC arrangements are possible and could be used with cellular network 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using cell towers 80 and MSCs 72, cellular network 14 could be implemented as a different wireless carrier system in the form of satellite communication that can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the transmitting station, packaged for upload, and then sent to the satellite, which broadcasts the programming to subscribers. Bi-directional communication can be, for example, satellite telephony services using one or more satellites to relay telephone communications between the vehicle 12 and the uplink station. If used, this satellite telephony can be utilized either in addition to or in lieu of cellular network 14.

Land network 86 may be a conventional land-based telecommunications network that is connected to one or more landline telephones and connects cell towers 80 to remote facility 88. For example, land network 86 may include a public switched telephone network (PSTN) such as that used to provide hardwired telephony, packet-switched data communications, and the Internet infrastructure. One or more segments of land network 86 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 88 need not be connected via land network 86, but could include wireless telephony equipment so that it can communicate directly with a wireless network.

Computer 84 can be one of a number of computers accessible via a private or public network such as the Internet. Each such computer 84 can be used for one or more purposes, such as a web server accessible by the router 30 via telematics unit 50 and cell towers 80. Other such accessible computers 84 can be, for example: a service center computer where diagnostic information and other vehicle data can be uploaded from the vehicle via the telematics unit 50; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 88, or both. A computer 84 can also be used for providing Internet connectivity such as DNS services or as a network address server that uses DHCP or other suitable protocol to assign an IP address to the vehicle 12.

Remote facility 88 is designed to provide the vehicle electronics 20 with a number of different system back-end functions. The remote facility 88 may include one or more switches, servers, databases, live advisors, as well as an automated voice response system (VRS), all of which are known in the art. Remote facility 88 may include any or all of these various components and, preferably, each of the various components are coupled to one another via a wired or wireless local area network. Remote facility 88 may receive and transmit data via a modem connected to land network 86. A database at the remote facility can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote facility 88 using a live advisor, it will be appreciated that the remote facility can instead utilize a VRS as an automated advisor or, a combination of the VRS and the live advisor can be used.

The wireless devices 90a and 90b are non-vehicle devices, meaning that they are not a part of vehicle 12 or vehicle electronics 20. Both devices 90a and 90b may also be referred to as an "external device" since they are external to vehicle electronics 20, regardless of whether they may be located inside or outside the vehicle at any one time. The wireless devices 90a and 90b include: hardware, software, and/or firmware enabling cellular telecommunications and/or short range wireless communication (SRWC), as well as other wireless device functions and applications. The hardware of the wireless devices 90a and 90b comprises a processor and memory for storing the software, firmware, etc. This memory may include volatile RAM or other temporary powered memory, as well as a non-transitory computer readable medium that stores some or all of the software needed to carry out the various external device functions discussed herein. The wireless device processor and software stored in the memory enable various software applications, which may be preinstalled or installed by the user (or manufacturer) (e.g., having a software application or graphical user interface (GUI)). This may include a wireless device application via which a vehicle user can communicate with the vehicle 12 and/or control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90a or 90b to activate or deactivate operation of the mobile hotspot from the respective device. Wireless devices 90a and 90b are shown as smartphones having cellular telephone capability. In other embodiments, device 90a or 90b may be a tablet, laptop computer, or any other suitable device. In addition, the application may also allow the user to connect with the remote facility 88 or call center advisors at any time.

Figure 2:
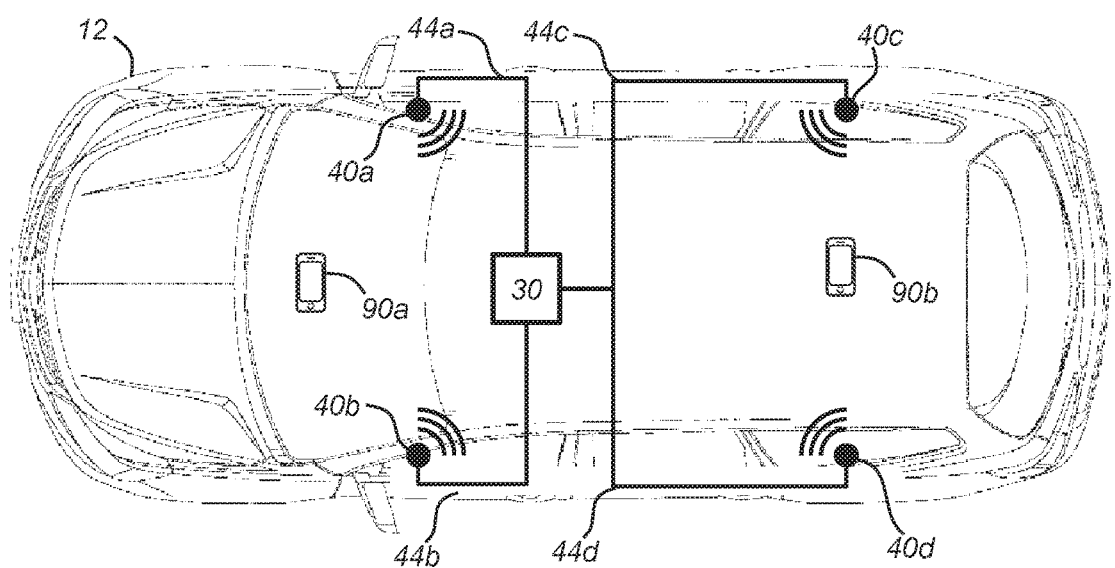
FIG. 2 is a block diagram depicting an embodiment of an arrangement of vehicle components and other system components.

Referring now to FIG. 2, vehicle 12 is illustrated from an overhead view such that one possible configuration of certain components and devices of vehicle electronics 20 is shown. Router 30 is shown connected via buses 44a-d to WAPs 40a-d, respectively. The wireless access points may be positioned throughout vehicle 12 and connected to router 30 in any configuration or arrangement and it should be appreciated that the illustration shown is only one example. Mobile device 90a or 90b may connect to the router via one or more of the WAPs 40a-d. As further discussed below, depending on a compatibility of the mobile devices 90a, 90b with the WAPs 40a-d, the mobile devices 90a, 90b may connect with any of the WAPs 40a-d. After a connection between the device 90a or 90b is established, the respective WAP to which the device is connected may pass data to and from router 30, which, in turn, communicates the data with one or more networks such as the Internet. For example, after a connection is established between device 90a and WAP 40b, then data, such as an HTTP request, may be communicated from WAP 40b via bus 44b to router 30. Router 30 then can provide the data to telematics unit 50 which, through an established connection with cell tower 80, may communicate the data to land network 86 and finally to computer 84 or remote facility 88 whereby the request is received. As such with an HTTP request, along the way the HTTP domain name may be resolved and directed to the appropriate server, such as may exist in remote facility 88 or at computer 84.

Each of the WAPs 40a-d may have different characteristics including, but not limited to, communication speeds, capacities, or communication frequency ranges, with varying effect on communications of devices 90a, 90b over each of the respective WAPs 40a-d. The devices 90a, 90b also may or may not be compatible with each of the WAPs 40a-d based upon these characteristics. Accordingly, as described further below the activation or operation of WAPs 40a-d be optimized to facilitate efficient operation and minimize any user difficulties in connecting their devices 90a or 90b to an appropriate one of the WAPs 40a-d.

In one exemplary illustration, the WAPs 40-d are associated with different vehicle systems or subsystems, or support different vehicle users or functions. Differences in characteristics such as communication capacities, frequency ranges, or the like may thereby result from the different systems and/or functions supported by each of the WAPs 40a-d. For example, WAPs 40a and 40b may each be associated with a primary infotainment system of the vehicle 12 facilitated by the telematic system 50, e.g., by playing music or video via the audio system 56 and/or display(s) 38. The WAPs 40a and 40b may have different operating characteristics. For example, the WAP 40a may have a different operational frequency, e.g., 5.0 GHz, than the WAP 40b (for example, 2.4 GHz). Additionally, WAP 40c may be associated with a rear seat entertainment (RSE) unit or system. WAP 40d may be associated with another system of the vehicle 12, e.g., a data recorder or other system providing a specific function in the vehicle 12, and may thus provide communications to support the particular function.

As such, the WAPs 40a-d may each be compatible with different sets of mobile devices or be targeted at different devices or users, e.g., rear seat passengers versus the driver or front seat passenger, or data recorders versus mobile phones. In one example, devices capable of communicating with the 5.0 GHz WAP 40a are typically also capable of communicating with the 2.4 GHz WAP 40b. Some devices capable of communicating with the 2.4 GHz WAP 40b, however, may not be capable of communicating with the 5.0 GHz WAP 40a. Additionally, the 5.0 GHz WAP 40a may support additional applications or functions of a device connected to the WAP 40a, or may have increased communication capabilities compared with the 2.4 GHz WAP 40b. Thus, to the extent a device, e.g., device 90a, is capable of communicating via the WAP 40a, there may be a preference for the device 90a to connect to WAP 40a instead of other available WAPs 40b, 40c, or 40d.

In order to increase the likelihood that the devices 90a, 90b will connect to the appropriate WAP 40, the WAPs 40a-d may be activated or otherwise made available to the devices 90a, 90b in a desired order, for example after the vehicle 12 is started or power is turned on. For example, upon vehicle 12 startup, the WAP 40a may first be activated, and the WAP 40b activated afterwards. A delay between the activation or availability of the WAPs 40a, 40b may allow the devices 90a, 90b, both of which typically scan for available WAPs periodically, to connect to the most appropriate one of the WAPs 40a-d. In one example, device 90a is capable of connecting via a 5 GHz connection, and thus the user may have a strong preference for connecting via the 5 GHz connection over a 2.4 GHz connection so long as the 5.0 GHz connection is available. By contrast, the device 90b may be an older device that is only capable of communicating via the 2.4 GHz connection. Thus, when the vehicle 12 is started, the 5.0 GHz WAP 40a is made available for communications use first. The device 90a may therefore "see" only the WAP 40a, and connect to WAP 40a. The device 90b, on the other hand, cannot connect via the 5.0 GHz connection, and thus continues to scan for available WAPs. After a delay following the activation of the WAP 40a, the WAP 40b is made available. The device 90b may then successfully connect to the WAP 40b. As will be described further below, a delay between activation or availability of the WAPS 40a, 40b may be at least as long as a scan period of the mobile devices 90a, 90b. In some examples a delay may be only a few seconds, or even fractions of a second. Accordingly, the devices 90a, 90b connect to the appropriate WAP without causing a connection delay that is noticeable to a user of the devices 90a, 90b.

The activation/availability of the WAPs 40c, 40d may be delayed after the activation/availability of the WAPs 40a and/or 40b. For example, WAP 40c, since it is servicing a rear-seat entertainment module which may be in demand less frequently than the WAPs 40a, 40b, may be delayed for some time period following the activation of the WAP 40b. The WAP 40d may be delayed further after the activation/availability of the WAP 40c, since it may be needed or used even less frequently.

Delays in activation of the WAPs 40a-d with respect to one another may be controlled in any manner that is convenient. For example, each of the WAPs 40a-d may individually scan for activation of any of the other WAPs 40 before activating, e.g., by activating or making themselves available for communication only after they confirm that the appropriate higher-priority WAP(s) is activated. More specifically, consistent with the example described above, the WAP 40b may scan for the activation of the WAP 40a before allowing activation of the WAP 40b, and the WAP 40c may scan to confirm that both of the WAPs 40a and 40b have been activated before allowing activation of WAP 40c. The WAPs 40a-d may operate in a "station mode" which permits them to scan or "sniff" for operation or activation of any other WAPs 40 that are appropriate, and then switch to an "ap mode" in which the WAPs 40a-d operate as access points to be used for communications by devices 90a, 90b. In other examples, the vehicle 12 may directly control the sequential activation, e.g., the controller 70 may activate the WAPs 40a-d in a desired order and with any desired delays between the devices.

Delays in between activation of the various WAPs 40a-d may also be adjusted based upon usage patterns or changes in priority. For example, where the rear seat entertainment unit is used less frequently than the data recorder or other WAPs in the vehicle 12 over a period of time, the WAP 40c may be reduced in priority with respect to the other WAPs, or may have a delay in activation behind other WAPs of vehicle 12 designed to ensure that devices will not connect to the WAP 40c unless they are specifically seeking out the WAP 40c.

Method—

Turning now to FIG. 3, an exemplary process 300 of operating a plurality of mobile hotspots in a vehicle is illustrated.

In some examples, process 300 may be initiated or may start in response to a vehicle ignition or start event. Thus, availability of any one or more mobile hotspots, e.g., the WAPs 40a-d, as an access point may in these cases occur in response to a vehicle start event. Other events may be used to initiate process 300, e.g., remote unlocking of vehicle 12 doors, or any other event indicating that a user(s) has approached the vehicle or otherwise is likely to begin using devices 90a, 90b in the vicinity of the WAPs 40a-d.

At block 305, a number of hotspots or WAPs of the vehicle may be input as a variable n. For example, as with vehicle 12 described above, there may be four WAPs, and thus n is set to the integer four (4).

Proceeding to block 310, a priority order of the hotspots may be determined. For examples, as described above, the WAP 40a may initially have first priority due to the desire to have 5.0 GHz-capable devices connected first, and the primary nature of the infotainment functions supported by the WAP 40a. WAP 40b may be secondary in priority, with the WAP 40c third in priority, and WAP 40d fourth in priority. Process 300 may also account for any changes in usage patterns since the previous initiation of process 300, e.g., as described further below at block 355.

Proceeding to block 315, a counter x may be initially set to the integer one (1). Process 300 may then proceed to block 320.

At block 320, process 300 may query whether the counter x is less than the variable n representing the number of WAPs or hotspots. Where x is less than n, process 300 may proceed to block 325. As will be further described below, after appropriate delay(s) are initiated for any WAPs, the counter x may be incremented, such that eventually the counter x is set to an integer equal to the number of WAPs n. Once the counter x is set to a value equal to n, process 300 proceeds to block 355. Initially, the counter x has a value of one (1) as noted above, and the variable n is four (4), and thus process 300 proceeds to block 325.

At block 325, a delay for the WAP or hotspot that is secondary in priority, i.e., the x+1 WAP, is determined. Accordingly, process 300 initially determines a delay for WAP 40b, which is the next WAP/hotspot in priority relative to WAP 40a. As noted above, the delay may be determined from a scan period or frequency typical of devices using the WAP in question. Each of the WAPs 40a-d may have a same delay, or may use WAP-specific delay periods such that one or more, or even all of the WAPs, have different delays. Merely as one non-limiting example, where it is known that the WAP 40b is typically used by devices having a scan period of two (2) seconds, the delay may be set to some period of time longer than the scan period, e.g., three (3) seconds. Process 300 may then proceed to block 330.

At block 330, process 300 may query whether hotspot x is available for devices, e.g., devices 90a and/or 90b, to connect and use for communications. In some examples, the next WAP in priority, i.e., the WAP having priority x+1, may use a station mode to sniff or scan for the availability of the WAP having priority x. Initially, for example, the WAP 40b may scan for the availability of the WAP 40a. In other approaches, other components of the vehicle 12, e.g., processor 70, may detect the availability of the higher priority WAP 40a.

Where the query of block 330 is negative, process 300 may proceed to block 335, where process 300 waits for a period of time. The period of time may be set to any period of time that is convenient to allow startup/availability of the higher priority WAP 40a, e.g., a few seconds or even a fraction of one second. The period of time may be predetermined, or chosen or determined at block 335. After the expiration of the period of time, process 300 proceeds back to block 330 and again queries whether the higher priority WAP 40a is available. Once the query is answered affirmatively, process 300 may proceed to block 340.

At block 340, the counter x may be incremented by the integer one (1). Accordingly, the counter is increased from one (1) to two (2).

Proceeding to block 345, an availability of a mobile hotspot x as an access point is delayed by a period of time. In some examples, the WAP next in priority, initially WAP 40b, may itself initiate the delay. In other approaches, the controller 70 or other components of vehicle 12 may initiate the delay. Process 300 may then proceed to block 350.

At block 350, availability of the next hotspot or WAP is enabled. Accordingly, the WAP 40b may be activated or otherwise made available for devices 90a, 90b to connect and/or communicate via the WAP 40b. In examples where the delay is handled directly by the WAP 40b, the availability of the WAP 40b as an access point may occur by the WAP 40b switching from a station mode to an access point mode. Process 300 may then proceed back to block 320.

Block 320, as seen above, generally directs process 300 to block 355 and in turn, to end, once the counter x is incremented to a value equal to the number of WAPs in the vehicle 12. In the example described above, initially the counter x has been incremented by one, i.e., to the integer two (2). Thus, process 300 proceeds to block 325, etc., eventually returning to block 320. In this manner, an appropriate delay is determined for each subsequent WAP present in the vehicle (i.e., at block 325), and activation/availability of each WAP is delayed in sequence (i.e., at blocks 345 and 350). Once process 300 passes through blocks 325, 340, 345, and 350 in connection with each of the WAPs 40a-d, the counter x has been incremented to four (4), and process 300 is then directed to block 355.

At block 355, usage data associated with the use of the WAPs 40a-d may be stored at vehicle 12, or even communicated remotely, e.g., to remote facility 88. Accordingly, in subsequent operations or uses of WAPs 40a-d, any relevant usage patterns may be accounted for, e.g., by changing priority of one or more of the WAPs 40a-d relative to each other. Process 300 may then terminate.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a mobile hotspot at a vehicle, wherein the vehicle includes vehicle electronics that include a plurality of mobile hotspots, each of which operates to provide wireless connectivity for one or more non-vehicle wireless devices located in the vehicle or within a proximity of the vehicle, wherein the vehicle electronics includes priority information indicating an order of priority of the plurality of mobile hotspots prior to carrying out the method, and wherein the method is carried out by the vehicle electronics and comprises the steps of:

determining a priority order of the plurality of mobile hotspots based on the priority information included in the vehicle electronics;

after determining the priority order of the plurality of mobile hotspots, activating a first one of the plurality of mobile hotspots to operate in an access point mode;

detecting an availability of the first mobile hotspot operating in the access point mode through using a second one of the plurality of mobile hotspots to detect a presence of a wireless message transmitted from the first mobile hotspot operating in the access point mode, wherein the first mobile hotspot is determined to be higher priority than the second mobile hotspot based on the priority information included in the vehicle electronics;

delaying an availability of the second mobile hotspot operating in the access point mode for a predetermined period of time after the detection of the availability of the first mobile hotspot operating in the access point mode; and activating the second mobile hotspot to operate in the access point mode after the predetermined period of time has expired.

2. The method of claim 1, further comprising altering the priority order of the first and second mobile hotspots.

3. The method of claim 2, further comprising determining a change in usage of the first and second mobile hotspots, wherein the priority is altered based at least upon the change in usage.

4. The method of claim 1, further comprising determining the predetermined period of time from at least a scan period associated with at least one non-vehicle wireless device.

5. The method of claim 4, wherein the predetermined period of time is longer than the scan period.

6. The method of claim 1, further comprising using a station mode of the second mobile hotspot to detect the availability of the first mobile hotspot.

7. The method of claim 6, further comprising enabling the availability of the second mobile hotspot as an access point by switching the second mobile hotspot from the station mode to the access point mode.

8. The method of claim 1, further comprising detecting the availability of the second mobile hotspot as an access point; and
delaying an availability of a third one of the plurality of the mobile hotspots as an access point for another predetermined period of time after the detection of the availability of the second mobile hotspot.

9. The method of claim 1, further comprising detecting the availability of the first mobile hotspot in response to a vehicle start event.

10. The method of claim 1, further comprising detecting the availability of the first mobile hotspot as an access point; and
seeking additional hotspots after the detecting of the availability of the first mobile hotspot.

11. The method of claim 10, further comprising determining that no additional hotspots are present; and
enabling the availability of the second mobile hotspot as an access point in response to the determining that no additional hotspots are present.

12. A method of operating a mobile hotspot at a vehicle, wherein the vehicle includes vehicle electronics that include a plurality of mobile hotspots, each of which operates to provide wireless connectivity for one or more non-vehicle wireless devices located in the vehicle or within a proximity of the vehicle, wherein the vehicle electronics includes priority information indicating an order of priority of the plurality of mobile hotspots prior to carrying out the method, and wherein the method is carried out by the vehicle electronics and comprises the steps of:
in response to a vehicle start event, determining a first one of the plurality of mobile hotspots to activate in an access point mode based on the priority information included in the vehicle electronics;
enabling an availability of the first mobile hotspot as an access point in response to the vehicle start event and the determination;
delaying an availability of a second one of the plurality of mobile hotspots as an access point for a predetermined period of time after detecting the availability of the first mobile hotspot so as to enable at least one of the one or more non-vehicle wireless devices to connect to the first mobile hotspot without interference from the second mobile hotspot, the first mobile hotspot being higher-priority than the second mobile hotspot; and
enabling an availability of the second mobile hotspot after expiration of the predetermined period of time by switching the second mobile hotspot from a station mode to the access point mode.

13. A vehicle having vehicle electronics, comprising:
a plurality of mobile hotspots, each configured to provide wireless connectivity for one or more non-vehicle wireless devices located in the vehicle or within a proximity of the vehicle;
wherein the vehicle electronics includes priority information indicating an order of priority of the plurality of mobile hotspots;
wherein the vehicle electronics are configured to:
determine a priority order of the plurality of mobile hotspots based on the priority information;
after determining the priority order of the plurality of mobile hotspots, activate a first one of the plurality of mobile hotspots to operate in an access point mode;
detect an availability of the first mobile hotspot operating in the access point mode through using a second one of the plurality of mobile hotspots to detect a presence of a wireless message transmitted from the first mobile hotspot operating in the access point mode, wherein the first mobile hotspot is determined to be higher priority than the second mobile hotspot based on the priority information;
wherein the second mobile hotspot is configured to delay an availability of the second mobile hotspot as an access point for a predetermined period of time after detecting an availability of the first mobile hotspot.

* * * * *